UNITED STATES PATENT OFFICE.

HAROLD HIBBERT, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

MANUFACTURE OF ORGANIC SOLVENTS.

1,086,048.     Specification of Letters Patent.     Patented Feb. 3, 1914.

No Drawing.     Application filed May 10, 1912. Serial No. 696,342.

*To all whom it may concern:*

Be it known that I, HAROLD HIBBERT, of Wilmington, in the county of Newcastle, and in the State of Delaware, have invented a certain new and useful Improvement in the Manufacture of Organic Solvents, and do hereby declare that the following is a full, clear, and exact description thereof.

My invention relates to a process for producing condensation products of organic compounds of different kinds, and is applicable to the production of condensation products of many different varieties within the field of organic compounds comprising compounds belonging to the aliphatic or aromatic series. My invention is particularly applicable, however, to the production of condensation products of aldehydes and ketones. My invention is especially adapted to the production of acetaldol from acetaldehyde by the condensation of two molecules of acetaldehyde to produce one molecule of acetaldol, in accordance with the following equation:—

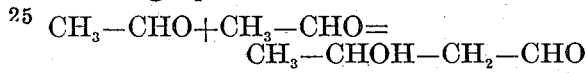

Prior to the time of my invention, such condensation products have been obtained by the use of different substances, preferably metallic salts such as the carbonates, cyanids or sulfites. The use of these substances has, however, been attended with marked disadvantages owing to the fact that their action is very slow and the amount of condensation product obtained correspondingly small, and further, that the isolation of the condensation products from aqueous solutions is tedious and expensive. The metallic hydroxids could not be used for this purpose as their addition to acetaldehyde has resulted in producing yellow resinous products, known as acetaldehyde resins. (See the *Lehrbuch der Organischen Chemie* of Meyer-Jacobsen.) I have discovered that this action of metallic hydroxids in producing such resinous products is especially marked in the presence of water. By means of my invention, in which I effect the condensation in solvents other than water, I am enabled to obtain condensation products by the use of metallic hydroxids such, for example, as potassium or sodium hydroxid without any tendency whatever to produce the resinous products ordinarily obtained by the action of metallic hydroxids in aqueous and other solutions.

In carrying out my invention I cause the action of the hydroxid to take place in a solution of the carbon compound acted upon in a non-aqueous liquid. I preferably use for this purpose a light hydrocarbon liquid such as gasolene, but I may use for this purpose any other anhydrous liquid which will dissolve the carbon compound to be acted upon without reacting with the same.

While my invention is capable of application to many different condensation reactions, as one illustrative embodiment thereof I may proceed as follows: I dissolve a quantity of acetaldehyde having a boiling point of 21° to 28° C., in a hydrocarbon or mixture of hydrocarbons such as gasolene. This solution is then cooled to the temperature of substantially —10° C. I then suspend in the liquid a small piece of solid caustic potash or caustic soda. In a few moments a condensation of the acetaldehyde takes place, acetaldol being formed on the surface thereof. The acetaldol thus formed being insoluble in the hydrocarbon solvent and having a higher specific gravity than the solution, separates out and accumulates at the bottom of the vessel. This action of the metallic hydroxid is effected without the production of any appreciable higher condensation products. When the action is completed, the immiscible liquids may be separated and any unchanged acetaldehyde, together with any gasolene remaining with the acetaldol may be separated therefrom by distillation, the latter being obtained as a clear, colorless product having a sharp boiling point between 80° and 85° C., under a pressure of 20 mm. Not only may this action be effected by the use of other carbon compounds and other anhydrous solvents not reacting upon the same, but it may also be effected by the use of other substances instead of the metallic hydroxids, for example, the salts of the alkalis or alkaline earth such as carbonates, sulfites, and cyanids, etc. I find, however, that the use of these latter substances is not advantageous, owing to the small degree of yield obtained and the slowness of the action.

By condensation I mean the union of molecules to produce a compound from which the original substance or substances cannot be regenerated by any simple method.

While I have described my invention above in detail, I wish it to be understood that many changes may be made therein without departing from the spirit of my invention.

I claim:

1. The process which comprises forming a condensation product by bringing into contact with a carbon compound dissolved in a substantially anhydrous liquid, a solid substance capable of producing a condensation product of the carbon compound, the action being effected between like molecules of the carbon compound without the splitting off of atoms from any of the compounds in contact with said substance.

2. The process which comprises forming a condensation product by bringing into contact with an aldehyde dissolved in a substantially anhydrous liquid, a solid substance capable of producing a condensation product of the aldehyde, the action being effected between like molecules of the carbon compound without the splitting off of atoms from any of the compounds in contact with said substance.

3. The process which comprises forming a condensation product by bringing into contact with an aldehyde dissolved in a substantially anhydrous liquid, a solid metallic hydroxid, the action being effected between like molecules of the carbon compound without the splitting off of atoms.

4. The process which comprises forming a condensation product by bringing into contact with a carbon compound dissolved in a substantially anhydrous liquid in which the condensation product is insoluble, a substance capable of producing a condensation product of the carbon compound, the action being effected between like molecules of the carbon compound without the splitting off of atoms.

5. The process which comprises forming a condensation product by bringing into contact with an aldehyde dissolved in a substantially anhydrous liquid in which the condensation product is insoluble, a substance capable of producing a condensation product of the aldehyde.

6. The process which comprises forming a condensation product by bringing into contact with a carbon compound dissolved in a substantially anhydrous liquid in which the condensation product is insoluble, a metallic hydroxid, the action being effected between like molecules of the carbon compound without the splitting off of atoms.

7. The process which comprises forming a condensation product by bringing into contact with an aldehyde dissolved in a substantially anhydrous liquid in which the condensation product is insoluble, a metallic hydroxid.

8. The process which comprises forming a condensation product by bringing into contact with a carbon compound dissolved in a substantially anhydrous liquid in which the condensation product is insoluble, a substance capable of producing a condensation product of the carbon compound, the action being effected between like molecules of the carbon compound without the splitting off of atoms and then drawing off the separated condensation product thus produced.

9. The process which comprises forming a condensation product by bringing into contact with an aldehyde dissolved in a substantially anhydrous liquid in which the condensation product is insoluble, a substance capable of producing a condensation product of the aldehyde, and then drawing off the separated condensation product thus produced.

10. The process which comprises forming a condensation product by bringing into contact with a carbon compound dissolved in a substantially anhydrous liquid in which the condensation product is insoluble, a metallic hydroxid, the action being effected between like molecules of the carbon compound without the splitting off of atoms, and then drawing off the separated condensation product thus produced.

11. The process which comprises forming a condensation product by bringing into contact with an aldehyde dissolved in a substantially anhydrous liquid in which the condensation product is insoluble, a metallic hydroxid, and then drawing off the separated condensation product thus produced.

12. The process of producing acetaldol comprising subjecting a solution of acetaldehyde in gasolene to the action of a caustic alkali.

13. The process of producing acetaldol comprising subjecting a solution of acetaldehyde in gasolene to the action of potassium hydroxid.

14. The process which comprises forming a condensation product by bringing into contact with a carbon compound dissolved in a substantially anhydrous liquid, a solid metallic hydroxid, the action being effected between like molecules of the carbon compound without the splitting off of atoms.

In testimony that I claim the foregoing I have hereunto set my hand.

HAROLD HIBBERT.

Witnesses:
C. R. MUDGE,
A. M. GORMAN.